May 12, 1964

M. ROY ETAL 3,132,827

HIGH SPEED AIRPLANE HAVING AUXILIARY ROCKETS

Filed July 26, 1961

INVENTORS
MAURICE Roy
PIERRE DUBAN
BY
Bailey, Stephens + Huettig
ATTORNEYS

May 12, 1964 M. ROY ETAL 3,132,827
HIGH SPEED AIRPLANE HAVING AUXILIARY ROCKETS
Filed July 26, 1961 5 Sheets-Sheet 3
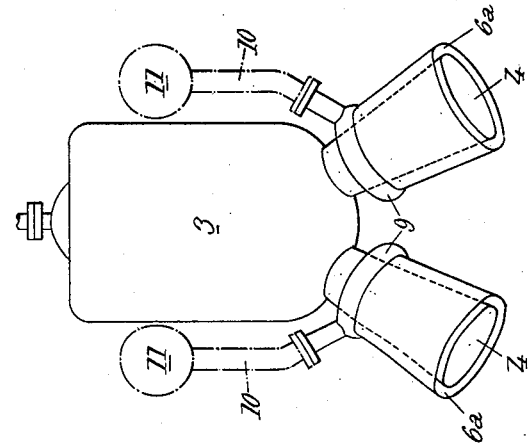
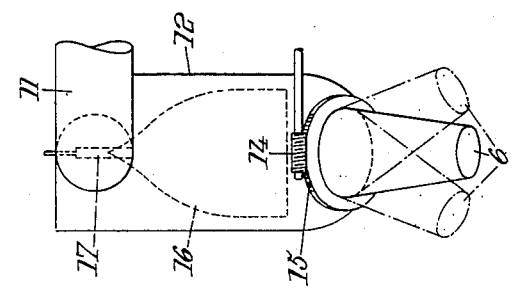
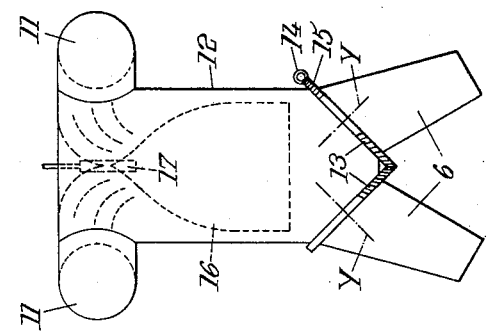
INVENTORS
Maurice Roy
Pierre Ouban
BY
Bailey, Stephens & Huettig
ATTORNEYS May 12, 1964  M. ROY ETAL  3,132,827
HIGH SPEED AIRPLANE HAVING AUXILIARY ROCKETS
Filed July 26, 1961  5 Sheets-Sheet 4
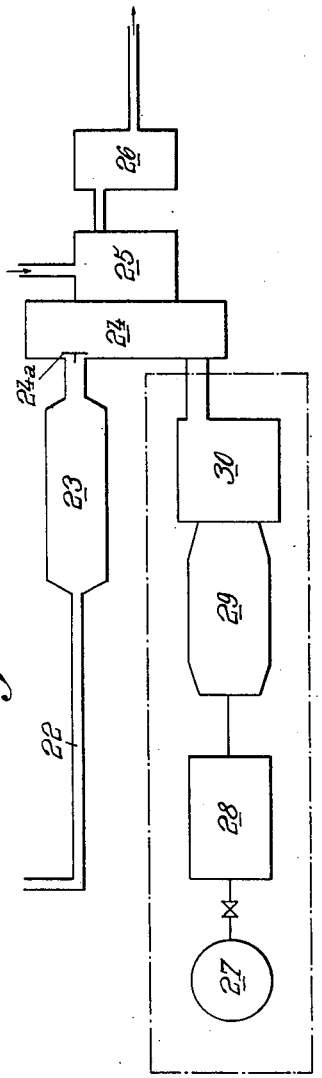
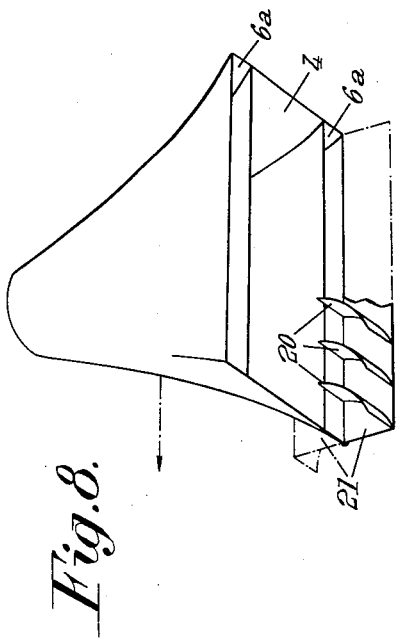
INVENTORS
Maurice Roy
Pierre Duban
BY
Bailey, Stephens + Huettig
ATTORNEYS May 12, 1964 M. ROY ETAL 3,132,827
HIGH SPEED AIRPLANE HAVING AUXILIARY ROCKETS
Filed July 26, 1961 5 Sheets-Sheet 5
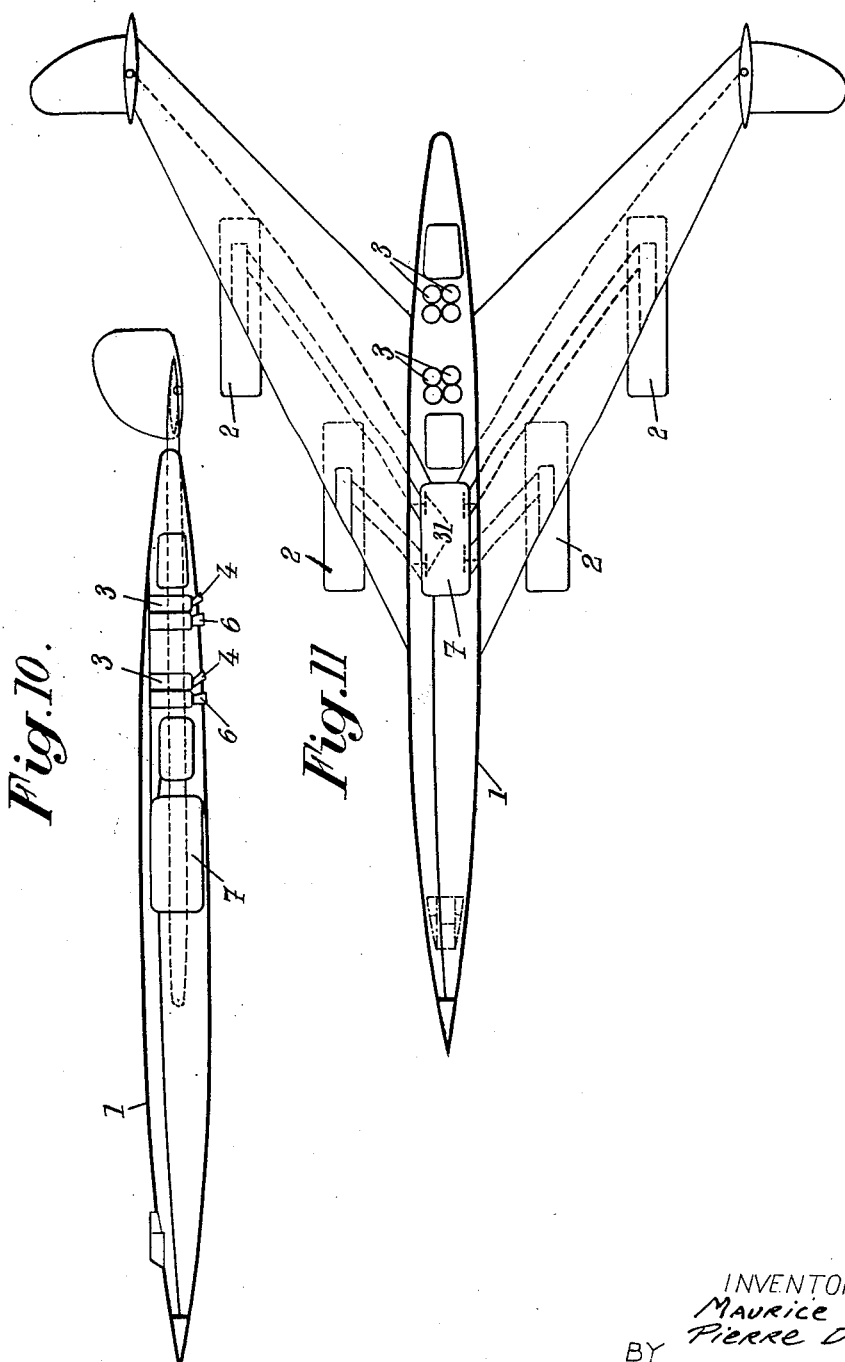
INVENTORS
Maurice Roy
Pierre Duban
BY
Bailey, Stephens & Huettig
ATTORNEYS

United States Patent Office 3,132,827
Patented May 12, 1964

3,132,827
HIGH SPEED AIRPLANE HAVING AUXILIARY ROCKETS
Maurice Roy and Pierre Duban, Paris, France, assignors to Office National d'Etudes et de Recherches Aero-nautiques, Chatillon-sous-Bagneux, France, a society of France
Filed July 26, 1961, Ser. No. 127,050
Claims priority, application France Aug. 27, 1960
32 Claims. (Cl. 244—74)

The present invention relates to airplanes provided with auxiliary rockets, this term designating in a general manner all airplanes comprising, in addition to a main power plant capable of providing propulsive power for normal flight (including ordinary evolutions), at least one auxiliary rocket engine capable of imparting to the airplanes, during a relatively short time, a thrust intended to facilitate a particular evolution of short duration, such for instance as take-off or landing. This invention is more especially but not exclusively concerned with fast airplanes, for instance airplanes intended to fly at high subsonic speeds at transonic speeds or even at supersonic speeds.

The object of this invention is to provide an airplane of this type which is better adapted to meet the requirements of practice than those known up to this time, in particular concerning take-off and landing.

According to our invention, the rocket engine means is disposed on the airplane in such manner that its thrust is directed upwardly along a line passing at least approximately through the center of gravity of the airplane and which makes with the direction perpendicular to the zero lift plane of the airplane an angle of at most 30°, whereby the action of said rocket engine means, when added to that of said main power plant, does not substantially modify the attitude of flight of the airplane.

Preferred embodiments of our invention will be hereinafter described with reference to the appended drawings given merely by way of example and in which:

FIG. 3 is a rear view of a rocket engine as used in the airplane shown by FIG. 2.

FIGS. 4 and 5 are respectively a front view and a side view of an auxiliary lift producing means provided with jet nozzles and of the type used in the airplane illustrated by FIG. 2.

FIG. 8 is a perspective view of a rocket engine nozzle to be used according to this invention.

FIG. 9 diagrammatically shows the lay-out of a circuit for feeding liquid propergol to a rocket engine for use according to this invention.

FIGS. 10 and 11 are a vertical longitudinal section and a plane view, respectively, of an airplane having a low wing loading and provided with four turbo-jet engines.

Figure 1:
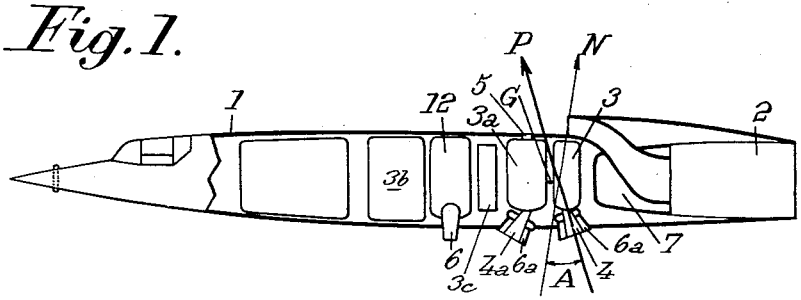
FIG. 1 is a diagrammatic vertical axial section of an airplane having a high wing loading and provided with a single main power plant, this airplane being made according to the present invention.

The airplane shown by FIG. 1 comprises an airframe 1 provided with a main power plant 2 capable of imparting to said airframe speeds higher than a minimum flying speed, that is to say than the minimum speed above which the aerodynamic forces acting upon the airframe produce a lift higher than the total weight of the airplane. The object of the invention is to provide this airplane with means capable of enabling it to rise very quickly when taking off or to alight very quickly when landing.

According to the main feature of this invention, the framework 1 of the airplane is provided with at least one rocket engine 3 the thrust P of which is directed upwardly along a line passing close to, or through, the center of gravity G of the airplane and which makes, with the direction N perpendicular to the zero lift plane of the airplane, an angle A at most equal to 30°.

The term "zero lift plane" designates a plane defined by two straight lines one of which is perpendicular to the plane of symmetry of the airplane, whereas the other one is parallel to the direction of the velocity at infinity, in the upstream direction, for which the resultant lift of the whole of the airplane is zero.

Thus the lift producing component of the thrust of rocket engine 3 has a preponderating action, this component balancing at least a portion of the weight of the airplane when the rocket engine is in operation.

Preferably, and as it will be hereinafter exposed, the rocket engine is mounted in such manner that the lift producing component of its thrust (or the resultant lift producing component of the elementary thrusts of different rocket engines simultaneously brought into action, when there are several such rocket engines) is either greater than the total weight of the airplane or smaller than this total weight by an amount sufficiently small to be able to be compensated by auxiliary lift producing means operated by a small portion of the power of the main power plant 2 of the airplane.

Thus during both take-off and landing periods the action of the rocket engine means permits of lifting the airplane in the air without making use (or at least without making use of an important fraction) of the power of the main power plant 2 of the airplane. It must be noted that, due to the direction of the thrust of the rocket engine means (and of the auxiliary lift producing means when such means are used), the attitude of flight of the airplane is not substantially modified by the action of said rocket engine means, either alone or possibly in combination with said auxiliary lift producing means. In particular during take-off, the airplane will remain substantially horizontal and before landing it will be either horizontal or pitched upwardly.

It will be understood that it is of great interest to be able to overcome the action of gravity on the airplane by means of the lift produced by the rocket engine means (or the rocket engine means combined with the auxiliary lift producing means) that is to say independently of the power of the main power plant 2, especially when said power is liable to vary in accordance with the external conditions of utilization (in particular, altitude and latitude of the take-off ground) which is the case in particular when the main power plant 2 is of the turbo-jet or of a similar type making use of a continuous or practically continuous stream of combustion supporting air.

We will now examine particular features of the invention relative to the location and the direction of the rocket engine means 3, it being understood that this means the direction of the resultant thrust axis of said rocket engine means (which will be hereinafter called thrust axis P).

This thrust axis P depends, concerning its direction, upon the direction of the axes of the nozzles 4 of the rocket engines that can be brought into service simultaneously.

It should be noted that there may be a jet nozzle for every rocket engine combustion chamber. But there may also be several jet nozzles for every combustion chamber or several combustion chambers may be connected with a single jet nozzle.

Anyway when there are several jet nozzles adapted to be brought into action simultaneously, these nozzles must be disposed symmetrically with respect to the plane of symmetry of the airplane so that their respective transverse components balance one another, if all the nozzles are identical.

It has been above stated that thrust axis P must make, with the direction N perpendicular to the zero lift plane of the airplane, an angle A at most equal to 30°.

In view of this condition, thrust axis P may be arranged in different manners. It may extend along direction N, in which case the corresponding nozzle or nozzles can serve both during take-off and landing;

It may be directed forwardly, in which case the corresponding nozzles which impart a longitudinal acceleration to the airplane must be used exclusively during take-off except in the particular case (which will be hereinafter discussed) where the airplane is strongly pitched upwardly when landing.

It may be directed toward the rear, in which case the corresponding nozzles which impart a longitudinal negative acceleration to the airplane must be brought into action exclusively during landing.

In order to illustrate what precedes and merely by way of example, we have shown on FIG. 1:

At 3 a rocket engine for taking-off, the jet nozzle 4 of this engine 3 being directed rearwardly and downwardly and, At 3a a rocket engine for landing the jet nozzle 4a of which is directed forwardly and downwardly.

When there are several rocket engines 3a it is advantageous to provide, on the fluid propergol feed circuit of the said landing rocket engine or engines, one or several safety valves 5 which open only for landing, so as to avoid any accidental operation of said rocket engine means during take-off.

It should also be noted that in the case of one or several landing rocket engines, their location and their direction must be such that thrust axis P passes through the center of gravity of the airplane in the unloaded state (or close to this center of gravity), this center of gravity in the unloaded state being generally offset with respect to the center of gravity G at take-off through which, or close to which, the thrust axis of the take-off rocket engine or engines must pass.

On the other hand, whatever be the nature of the rocket engines that are provided (either for take-off and/or for landing), they are disposed in such manner that account being taken of the type of airplane and of the conditions inherent in the desired direction to be finally obtained for thrust axis P, any risk is avoided of a thermal action on the structure of the airplane of the gas jets issuing from the nozzles of said rocket engines, either directly or after reflection on the ground.

For this purpose the rocket engine means may be mounted and/or constructed so as to have a suitable given direction of the nozzle or nozzles thereof, said nozzle or nozzles being possibly provided with means, such as deflecting flaps, making it possible, once the rocket engine means is in action, to modify to some degree the direction of the thrust axis thereof.

The rocket engine means may also be arranged or mounted in such manner that the whole thereof, or preferably only the nozzle or nozzles thereof, may be adjusted in direction.

Finally, the rocket engine means may be mounted in a permanent fixed manner on the airplane, advantage being taken of the differences of attitude of the airplanes when taking off and landing to obtain substantially the desired directions for the thrust axis according as the airplane is taking off or landing.

This last mentioned solution corresponds to the above stated exception relative to a take-off rocket engine mounted on an airplane which has a great angle of positive incidence when landing, this rocket engine being arranged to supply a longitudinal forward thrust component to the airplane as it takes off.

In this case the thrust axis P is inclined toward the front with respect to direction N at an angle substantially equal to one half of the maximum admissible value for this angle, so that this inclination is about 15°. Thus, when the airplane is taking off the rocket engine supplies a longitudinal acceleration and when the airplane is in the attitude corresponding to landing the rocket engine, due to the great upward pitching of the airplane, supplies a longitudinal deceleration.

As for the means to be provided for giving an adjustable direction to the nozzle of the rocket engine means, they will be described hereinafter in detailed fashion.

With an airplane made as above described, the rocket engine means permit take-off or landing practically without any run of the airplane on the ground, said rocket engine means further being able, when suitably inclined, of imparting a longitudinal acceleration or deceleration to the airplane; the whole or practically so of the power of the main power plant remains available for propelling the airplane horizontally upon taking off or slowing it down when landing, for instance by reversal of the jet of power plant 2.

In other words, the rocket engine means provide the desired lift during the very short period (of some seconds) between the time where the airplane is stationary on the ground and that where it is air-borne, while permitting a nearly total use of the power of the main power plant during this short period, the airplane having practically no run to make on the ground, both when taking off and when landing. The short duration of the period for which the rocket engine means are in operation and the high longitudinal accelerations made possible by the full use of the main power plant are such that the jets of said rocket engine means do not strike the ground for any long time at the same place.

It has been indicated above that the rocket engine means must not necessarily ensure the whole of the lift necessary for taking off and landing since some complementary lift is advantageously supplied by the auxiliary jet nozzles operated by a small portion of the power of the main power plant.

These supplementary jet nozzles may be independent of the nozzles 4 of rocket engines 3, as it is the case for auxiliary jet nozzles 6 of FIGS. 1, 2, 4–7 and 10.

These auxiliary jet nozzles may also surround at least the outlets of rocket nozzles 4, as it is the case for auxiliary nozzles 6a in FIGURES 1, 2, 3, 6 and 8.

Auxiliary jet nozzles 6 or 6a may be either fixed or adjustable in position and means may be provided for adjusting the flow rate through said auxiliary jet nozzles.

In the case of annular auxiliary jet nozzles 6a surrounding the nozzles of the rocket engines, the gases issuing from the annular auxiliary nozzle 6a form, around the gas jet at high temperature issuing from the corresponding rocket nozzle, a gaseous sheath which isolates to some degree said gas jets from the surrounding structures.

If care is then taken, according to a particular feature of this invention, to feed annular nozzles 6a with gas at a temperature substantially lower than that of the gas issuing from the rocket nozzle, the gaseous sheath formed about every rocket jet will form a thermal screen and will produce, over some distance, relatively cool boundary layers capable of protecting the airplane against an accidental action, whether direct or indirect by reflection from the ground, of said boundary layers. Furthermore, this arrangement reduces the thermal impact of the rocket jets on the ground. Finally, the presence of a relatively cold gaseous sheath flowing at moderate velocity is capable of reducing the exhaust noise of the rocket engine.

Another way of attenuating the thermal and noise effects of the jets of the rocket engine means is to lower their speed and their temperature by causing said jets to act as entraining jets of ejector-like structures, the fluid that is entrained by said rocket jets coming either from the atmosphere, for instance through holes formed in the upper portion of the fuselage, or from a stream collected from the main power plant 2.

Concerning now the feed of auxiliary jet nozzles 6 or 6a, it is obtained as above stated from the main power plant 2 of the airplane, and it therefore depends upon the nature of this main power plant.

Preferably, the main power plant 2 is a turbo-jet and advantageously a by-pass, or dual circuit, turbo-jet, that is to say one including a secondary air circuit. In the case of a single circuit turbo-jet, we may, in order to feed the auxiliary jet nozzles 6 or 6a, either collect air from one stage of the turbo-jet compressor or associate with said turbo-jet a turbo-compressor unit.

On the contrary, if the turbo-jet is of the by-pass type, as it will be hereinafter supposed, the auxiliary jet nozzles 6 or 6a are advantageously fed with air from a tank 7 fed from the secondary air circuit of the turbo-jet. The air collected from this tank 7 may be heated before being sent to the auxiliary jet nozzle, this solution being preferable in the case of auxiliary jet nozzle 6 independent of the nozzles of the rocket engines; in this case the auxiliary jet nozzles, which may be mounted in fixed or adjustable manner at suitably chosen points of the airframe are intended to produce, in particular for flight at a speed lower than the minimum lift speed (where the aerodynamic control surfaces have but little efficiency) a portion of the forces necessary for controlling the airplane.

The air from tank 7 may also be sent directly to the auxiliary jet nozzles, in particular when said jet nozzles 6a surround the rocket engine nozzles, because in this case the thermal protection achieved by the annular jets is the better as said jets are at a lower temperature.

In the first of the two above mentioned cases, heating of the secondary air is advantageously performed by means of a heat source working normally at a medium temperature (substantially lower than that of the jets issuing from the rocket engine nozzles) but capable in case of failure of the corresponding rocket engine of operating for a short time at high temperature.

Figure 2:
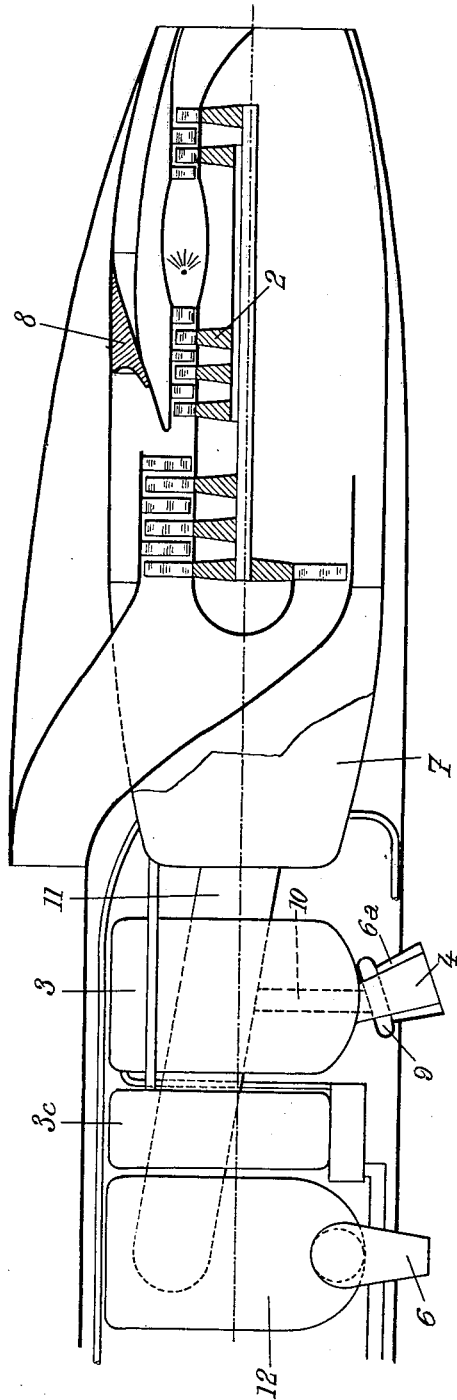
FIG. 2 is a diagrammatic vertical axial section of the rear portion of an airplane having a low wing loading and provided with a single power plant, this airplane being made according to another embodiment of this invention.

FIG. 2 shows a by-pass turbo-jet 2 provided with an annular valve 8 capable of occupying either a position where the secondary airstream flows along its normal path or positions for which the whole or a portion of this secondary air stream is deflected into tank 7.

In the example illustrated by FIG. 2, tank 7 supplies air to the three following elements:

(a) Fixed annular auxiliary nozzles 6a each fed individually through an annular inlet chamber 9 connected through a conduit 10 with one or several pipes 11 themselves fed from tank 7;

(b) Auxiliary nozzles 6, of adjustable direction, fed with secondary air from pipe 11 which has flown through a heating chamber 12; and (c) A device 3c to control the feed of fluid propergol to the rocket engine means, said device 3c being of course located as close as possible to said rocket engine means.

Concerning the system formed by a rocket engine 3 (together with its nozzles 4) and annular auxiliary jet nozzles 6a surrounding said rockets 4, it may be made as shown by FIG. 3, where such a system forms a single unit which can be removed as a whole and disengaged from the airframe after disconnection of the annular chambers 9 of nozzles 6a from their feed conduits 10 (on FIG. 3 the portions remaining permanently on the airplane have been shown in dot-and-dash lines).

The system formed by auxiliary jet nozzles 6 of adjustable direction and the heating chamber 12 through which said nozzles are fed is advantageously made as shown by FIGS. 4 and 5.

Nozzles 6, the number of which is for instance two, are pivotable about axes Y converging toward the axis of chamber 12 and each inclined with respect to the axis of the corresponding nozzle 6.

The inlet end of each of said nozzle 6 carries a toothed sector 13 having conical teeth, the toothed sectors 13 of the two nozzles being in mesh with each other and the whole of these two nozzles being controlled by means of an endless screw 14 cooperating with a sector 15 having helical teeth carried by one of the nozzles.

Heating chamber 12 contains a furnace 16 working at moderate temperatures and the burner or burners 17 of which are preferably fed from the feed pump of the turbo-jet.

Heating chamber 12 is provided at its upper part with lateral feed pipes 11 connected directly with tank 7 which contains a reserve of secondary air from the turbo-jet.

Such a pivoting arrangement of auxiliary jet nozzle 6 may be made in such manner as to permit of imparting to said nozzles a change of direction of about ±15° with respect to their mean position.

It should be pointed out that the reserve of secondary air contained in tank 7 may be used for the continuous or discontinuous operation of any auxiliary devices belonging to the airplane and operated by means of compressed air.

Figure 6:
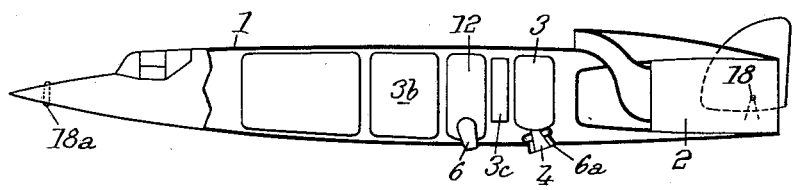
FIGS. 6 and 7 are a vertical longitudinal section and a plan view, respectively, of the airplane the rear portion of which is shown in detailed fashion by FIG. 2.
Figure 7:
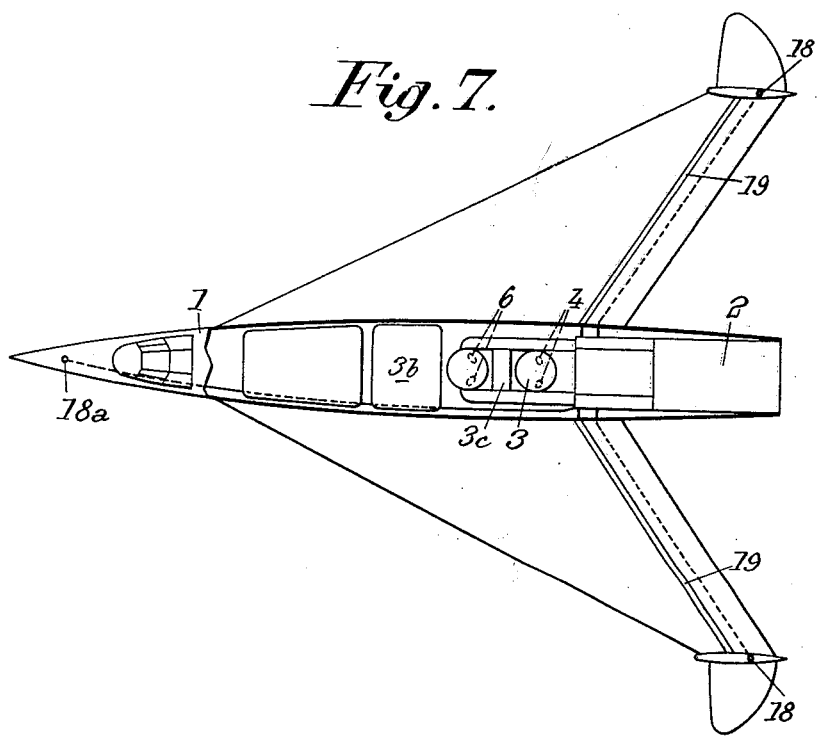

For instance tank 7 may serve to provide air under pressure, in particular when flying below the minimum lift speed, not only to auxiliary jet nozzles 6 and 6a but to balancing nozzles 18 to produce rolling and yawing movements of the airplane and to a nozzle 18a to produce pitching movements of said airplane. These last mentioned nozzles are located as shown by FIGS. 6 and 7 on portions of the airframe where the efficiency is maximum. Furthermore, air from tank 7 may be used for feeding blowing slots intended to improve the aerodynamic flow along the wings, flaps, control surfaces and the like of the airplane.

It should be noted that, in the absence of rocket engine means or auxiliary lift producing nozzles capable of giving a component having a strong decelerating action, the use of means for reversing the jet of the main power plant 2 is practically necessary.

FIG. 8 shows a particular embodiment of a rocket engine nozzle. In this case nozzle 4 has a flat shape. For instance, its outlet is of rectangular cross-section, the side walls of longer dimension being parallel to the longitudinal axis of the airplane. Along these sides of nozzle 4 are provided nozzle elements 6a for the outflow of air at lower temperature than the gas jet passing through nozzle 4, these elements 6a constituting side auxiliary nozzles. Furthermore, on at least one of said side walls and near the outlet of the nozzle there is provided a set of blades 20 carried by pivoting plate 21 adapted to pass, under the action of suitable control means, from a position (shown in dot-and-dash lines) where the set of blades 20 is outside of the jets issuing from nozzle 4 and 6a to a position (shown in solid lines) where said set of blades 20 extends across the jet of air passing through the corresponding auxiliary nozzle 6a and also across a small portion of the jet issuing from the nozzle 4 of the rocket engine. These blades 20 serve to deflect the gas streams toward the front and thus impart a longitudinal deceleration to the airplane.

Concerning the nature of the rocket engines 3 and 3a, it is pointed out that it is advantageous, according to this invention, to make use of rocket engines of the hybrid type making use of a solid propergol (lithergol) housed in the combustion chamber of the rocket engine and of at least one fluid propergol, preferably a liquid, which is distributed in a gradual and preferably adjustable manner into said combustion chamber.

Furthermore these solid and liquid propergols are advantageously chosen so that they have a hypergolic character with respect to each other.

Rocket engines of this type and propergols suitable for operating them were described in the U.S. patent application Ser. No. 49,650, filed on August 15, 1960, by Andre Moutet and Helen Moutet for "Improvements in Hypergolic Systems in Particular for Use in Rocket Engines."

Thus by way of example the fluid propellant may be nitric acid and the solid propellant a mixture of 80% of para-anisidine and 20% of polyvinyl chloride suitably plastified, for instance by means of butyl-phthalate.

The use of such a rocket engine is particularly advantageous for the following reasons:

Safety of utilization is very high due to the fact that the risk of explosion of the rocket engine in flight is practically eliminated since no accidental accumulation of liquid propergol can take place in the combustion chamber in view of the hypergolic character of the components of the system;

Adjustment of the thrust developed by every rocket engine may be obtained in a simple and accurate manner by varying the flow rate of fluid propergol fed to the combustion chamber, the time of response of such a rocket engine being extremely short and permitting an automatic control of the rocket engine in accordance with the altitude of the airplane, for landing and possibly for take-off;

Maintenance of such a rocket engine in working state is easy because, according to a feature above stated with reference to FIG. 3, the whole of the combustion chamber (lined with the solid propellant) and of the nozzles fed from said combustion chamber may be made in the form of an interchangeable unit; and Adaptation of the rocket engine to the airplane is facilitated because the furnace of hybrid rocket engines permits modifications of construction much more numerous than in the case of the combustion chamber of a rocket engine making use of a fluid propellant, this furnace being possibly disposed vertically or longitudinally in the body of the airplane and deflected means being provided to obtain the desired direction of the gas jet.

Concerning now the circuit for feeding liquid propergol to the rocket engine it is advantageously made as illustrated by FIG. 9 and includes on the one hand a normal circuit comprising an air intake fed from the secondary circuit of the turbo-jet, a simplified combustion chamber 23 having its outlet connected with the intake of a turbine 24 which drives a pump 25 for delivering liquid propergol and an injection regulator 26. On the other hand, there is provided an emergency circuit located on FIG. 9 within a dot-and-dash lines frame. This emergency circuit comprises a reserve 27 of gas under pressure adapted to expel from a tank 28 a fluid propellant stored in this tank. The propellant thus expelled is fed to an auxiliary chamber 29 preferably containing a solid propellant adapted to produce, under the action of a fluid propellant, hot gases under pressure. This chamber 29 is followed by a device 30 for cooling these hot gases under pressure, the gases thus cooled being sent to turbine 24 and pump 25 through which the fluid propellant is fed to the combustion chamber of the rocket engine, the normal circuit being brought out of action by an automatic valve 24a provided for this purpose at the intake of turbine 24.

The characteristic feature of the present invention may be applied to the construction of many different airplanes and we will now describe three types of such airplanes given of course merely by way of example.

The first type of airplane illustrated by FIG. 1 is powered by a single main power plant and has a high wing loading, so that it is necessary to be able to produce accelerating and decelerating components by means of the rocket engine means.

For this purpose we provide two liquid and solid propellants rockets 3 and 3a inclined in opposed directions respectively, rocket 3 serving to take-off and rocket 3a to landing. The take-off rocket engine 3 contains an amount of propellants slightly greater than that necessary for taking off, whereas the landing rocket engine 3a contains an amount of propellants slightly greater than that necessary for landing. There is provided a tank 3b for fluid propellant (the total weight of which is higher than that of the lithergol) common to both of the rocket engines and we thus avoid the risk that would exist if both of the feed systems were distinct. As a matter of fact, in this case, there would be a risk, both when taking off and when landing, of having an amount of fluid propellant slightly insufficient for the last seconds of operation to be obtained. As already indicated the feed circuit leading to the landing rocket engine is stopped by a valve which is opened only at the very time of landing, which ensures an unaltered quality of the solid propellant surface of the landing rocket.

The airplane may be further provided with a lift producing device consisting of an auxiliary jet nozzle 6 either fixed or adjustable in position, located in such manner that its thrust axis passes at the front of the center of gravity of the airplane.

The second type of airplane, illustrated by FIGS. 6 and 7, has a single main power plant and a low wing loading, so that its minimum flying speed has a moderate value.

This airplane is provided with a single rocket engine 3 giving an accelerating component during take-off and a deceleration component (due to the strong upward pitching of the airplane) when landing, the thrust of this rocket engine passing through the zone of the center of gravity of the airplane.

There is further provided an auxiliary lift producing device having at least one independent auxiliary nozzle 6 adjustable in direction, located at the front of the rocket engine 3 and disposed in such manner that its thrust axis always passes at the front of the center of gravity of the airplane.

The monoplane wing of this airplane has an important sweep-back.

To avoid that the gas jet reflected from the ground be able to strike the rear part of the fuselage, rocket engine 3 comprises two nozzles 4 directed downwardly and extending toward the rear and toward the outside, these nozzles having symmetrical positions with respect to the longitudinal plane of symmetry of the airplane. It should be noted that such an arrangement of the nozzles of the rocket engine could be used in the case of the airplane of FIG. 1 and also that it could be applied to the auxiliary lift producing nozzle 6.

The third type of airplane, illustrated by FIGS. 10 and 11, comprises four main power plants and has a low wing loading. The construction of this airplane is based upon the same considerations as those above stated concerning the airplane of FIGS. 6–7, with the difference that account must be taken of the greater weight of the airplane and of the presence of several main power plants.

Therefore, there are several groups including each a rocket engine 3 and an auxiliary lift producing device with jet nozzles 6. For instance there are two such groups mounted in tandem-like fashion, preferably on opposed side of the center of gravity of the airplane.

A single tank 7 is provided to feed the auxiliary nozzles, this tank being itself fed from the secondary circuits of the main power plants 2, with the interposition of check valve device 31.

On the other hand, in the case of such an airplane having a plurality of main power plants, it is advantageous, in order to be able to land in case of failure of one of the power plants, to provide jet nozzles capable of balancing the yaw movement due to such a failure.

In a general manner, while we have, in the above description, disclosed what we deem to be a practical and efficient embodiment of our invention, it should be well understood that we do not wish to be limited thereto as there might be changes made in the arrangement, disposition and form of the parts without departing from the principle of the present invention as comprehended within the scope of the accompanying claims.

What we claim is:

1. An airplane which comprises, in combination, a lift producing airframe, a main power plant mounted on said airframe to provide horizontal propulsive power for normal flight of said airplane rocket engine means mounted on said airframe to impart thereto a temporary auxiliary thrust, said rocket engine means being disposed so that its thrust is directed upwardly and forwardly along a line passing at least approximately through the center of gravity of the airplane and which makes with the direction perpendicular to the zero lift plane of the airplane an angle of at most 30° and always at most equal to one half of the maximum angle of incidence of said airframe propelled by said main propulsive power plant, said main power plant including means for delivering compressed air capable of assisting said rocket engine means, the whole of said rocket engine and said air delivering means being of a power such that it is capable of achieving a substantially vertical take off of said airplane.

2. An airplane which comprises, in combination, a lift producing airframe, a main power plant including at least one air circuit to supply compressed air mounted on said airframe to provide horizontal propulsive power for normal flight, rocket engine means mounted on said airframe to impart thereto a temporary auxiliary thrust, said rocket engine means being disposed so that its thrust is directed upwardly and forwardly along a line passing at least approximately through the center of gravity of the airplane and which makes with the direction perpendicular to the zero lift plane of the airplane an angle of at most 30°, and auxiliary lift producing means operated by said main power plant for feeding compressed air from said main circuit to cooperate with said rocket engine means to achieve, together therewith, a substantially vertical take-off of said airplane, the angle made by the sum of said thrust and of said auxiliary lift producing means with the direction perpendicular to the zero lift plane of the airframe being at most equal to one half of the maximum angle of incidence of said airframe propelled by said main propulsive power plant.

3. An airplane according to claim 2 wherein said auxiliary lift producing means comprises at least one jet nozzle.

4. An airplane which comprises, in combination, a lift producing airframe, a main power plant mounted on said airframe to provide horizontal propulsive power for normal flight of said airplane, rocket engine means mounted on said airframe to impart thereto an auxiliary thrust, said rocket engine means being disposed so that the thrust thereof can be directed upwardly and either frontwardly or rearwardly along a line passing at least approximately through the center of gravity of the airplane and making with the direction perpendicular to the zero lift plane of the airplane an angle of at most 30° and always at most equal to one half of the maximum angle of incidence of said airframe propelled by said main propulsing power plant, said main power plant including means for delivering compressed air capable of assisting said rocket engine means, the whole of said rocket engine and said air delivering means being so arranged and of a power such that it is capable of achieving a substantially vertical take off or landing of said airplane.

5. An airplane according to claim 4 wherein said rocket engine means has a fixed jet nozzle.

6. An airplane according to claim 3 wherein said auxiliary lift producing means has a fixed jet nozzle.

7. An airplane according to claim 3 wherein said rocket engine means has a jet nozzle adjustable in position.

8. An airplane according to claim 3 wherein said auxiliary lift producing means has a jet nozzle adjustable in position.

9. An airplane according to claim 1 wherein said rocket engine means is disposed with respect to said direction perpendicular to the zero lift plane in such manner that its thrust has a forward longitudinal component.

10. An airplane according to claim 3 wherein said auxiliary lift producing means comprises a plurality of jet nozzles distributed symmetrically with respect to the longitudinal plane of symmetry of the airplane.

11. An airplane according to claim 2 wherein said auxiliary lift producing means comprises at least one jet nozzle wholly independent of said rocket engine means.

12. An airplane according to claim 2 wherein said rocket engine means comprises at least one jet nozzle and said auxiliary lift producing means comprises an annular jet nozzle surrounding said first mentioned nozzle.

13. An airplane according to claim 2 wherein said main power plant is a turbo-jet engine, said auxiliary lift producing means comprising jet nozzles fed with a gaseous stream collected from said turbo-jet engine.

14. An airplane according to claim 2 wherein said main power plant is a by-pass turbo-jet engine, including a main air circuit and a secondary air circuit, said auxiliary lift producing means comprising jet nozzles, and means for feeding said last mentioned jet nozzles with air from said secondary air circuit.

15. An airplane according to claim 11 further comprising means for reheating the gaseous stream flowing through said independent jet nozzle.

16. An airplane according to claim 14 further comprising balancing jet nozzles and means for feeding said last mentioned jet nozzles from said secondary air circuit.

17. An airplane according to claim 4 wherein said rocket engine is a hybrid rocket making use of a solid propellant and at least one fluid propellant.

18. An airplane according to claim 17 wherein said solid propellant and said fluid propellant have a hypergolic character.

19. An airplane according to claim 2 wherein said auxiliary lift producing means comprises at least one jet nozzle adjoining a jet nozzle of said rocket engine and fed with air at lower temperature than that of the gas stream issuing from said rocket nozzle, and retractable means for deflecting the air stream issuing from said air nozzle and a portion of the gas stream issuing from said rocket nozzle.

20. An airplane according to claim 10 further comprising means for individually controlling said auxiliary lift producing nozzles for piloting purposes.

21. An airplane according to claim 2 wherein said rocket engine means comprises at least one jet nozzle, further comprising means for feeding around the gas jet of said nozzle a gas at lower temperature than that of said gas jet to cause said gas jet to entrain said gas at lower temperature in ejector-like fashion.

22. An airplane according to claim 4 wherein said rocket engine means comprises at least two rocket engines each having at least one jet nozzle, the first of said rocket engines having its nozzle inclined rearwardly and downwardly and being intended to be used for take-off, the other of said rocket engines having its nozzle inclined forwardly and downwardly and being intended to be used for landing, an individual solid propellant tank for each of said rocket engines respectively and a common fluid propellant tank for both of said rocket engines.

23. An airplane according to claim 4 wherein said rocket engine means consists of a single rocket engine mounted in fixed position on said airframe so as to have at least one jet nozzle directed rearwardly and downwardly when said airplane is taking off, said jet nozzle being directed frontwardly and downwardly when said airplane is landing with a great angle of incidence.

24. An airplane according to claim 23 wherein said rocket engine has two jet nozzles extending rearwardly and away from each other.

25. An airplane according to claim 23 further including an auxiliary jet nozzle directed rearwardly and the thrust axis of which passes at the front of the center of gravity of the airplane, and means for feeding said auxiliary jet nozzle with a gaseous stream collected from said main power plant.

26. An airplane according to claim 2 the main power plant of which comprises several turbo-jets located at different points of the airframe, said auxiliary lift producing means comprising several lift producing jet nozzles, this airplane comprising several balancing jet nozzles a single compressed air tank for the feed of the desired lift producing jet nozzles and balancing jet nozzles, and means connecting said tank with said turbo-jets to feed said tank with compressed air from said turbo-jets.

27. An airplane according to claim 2 wherein said rocket engine means consists of at least one hybrid rocket making use of a solid propellant and at least one fluid propellant, said airplane comprising a pump for feeding said fluid propellants to said rocket, a turbine operatively connected with said pump for driving it, means for normally feeding said turbine with a stream of power gas, and an emergency system for feeding said turbine with a stream of power gas in case of failure of said normal feeding means, said emergency system comprising an auxiliary hot gas generator of the chemical reaction type.

28. An airplane which comprises, in combination, a lift producing airframe, a main power plant mounted on said airframe to provide a horizontal propulsive power for normal flight of said airplane, rocket engine means mounted on said airframe to impart thereto an auxiliary thrust, said rocket engine means being disposed so that the thrust thereto can be directed upwardly and forwardly along a line passing at least approximately through the center of gravity of the airplane and making with the direction perpendicular to the zero lift plane of the airplane an angle of at most 30° and always at most equal to one half of the maximum angle of incidence of said airframe propelled by said main propulsing power plant, said main power plant including means for delivering compressed air capable of assisting said rocket engine means, the whole of said rocket engine and said air delivering means being of a power such that it is capable of achieving a substantially vertical landing of said airplane.

29. An airplane which comprises, in combination, a lift producing airframe, a main power plant mounted on said airframe to provide horizontal propulsive power for normal flight of said airplane, rocket engine means mounted on said airframe to impart thereto an auxiliary thrust, said rocket engine means being disposed so that the thrust thereof can be directed upwardly and forwardly along a line passing at least approximately through the center of gravity of the airplane and making with the direction perpendicular to the zero lift plane of the airplane an angle of at most 30° and always at most equal to one half of the maximum angle of incidence of said airframe propelled by said main propulsing power plant, the whole of said rocket engine and said air delivering means being of a power such that it is capable of achieving a substantially vertical takeoff of said airplane, and means for surrounding at least one gas jet issuing from said rocket engine means with a sheath of gas at lower temperature.

30. An airplane according to claim 28 wherein said rocket engine means is disposed with respect to said direction perpendicular to the zero lift plane in such manner that its thrust has a rearward longitudinal component.

31. An airplane according to claim 4 further comprising means fed from said means for delivering compressed air for surrounding at least one gas jet issuing from said rocket engine means with a sheath of compressed air at a temperature lower than that of said gas jet.

32. An airplane which comprises, in combination, a lift producing airframe, a main power plant including at least one air circuit to supply compressed air mounted on said airframe to provide horizontal propulsive power for normal flight, rocket engine means mounted on said airframe to impart thereto a temporary auxiliary thrust, said rocket engine means being disposed so that its thrust is directed upwardly in the middle longitudinal plane of said airplane along a line passing at least approximately through the center of gravity of the airplane and which makes with the direction perpendicular to the zero lift plane of the airplane an angle of at most 30°, and auxiliary lift producing means operated by said main power plant for feeding compressed air from said main circuit to cooperate with said rocket engine means to achieve, together therewith, a substantially vertical take-off of said airplane, the angle made by the sum of said thrust and of said auxiliary lift producing means with the direction perpendicular to the zero lift plane of the airframe being at most equal to one half of the maximum angle of incidence of said airframe propelled by said main propulsive power plant.

References Cited in the file of this patent

UNITED STATES PATENTS

| | | |
|---|---|---|
| 2,398,125 | Summerfield et al. | Apr. 9, 1946 |
| 2,870,978 | Griffith et al. | Jan. 27, 1959 |
| 2,930,544 | Howell | Mar. 29, 1960 |
| 2,943,821 | Wetherbee | July 5, 1960 |
| 2,946,285 | Nauschutz et al. | July 26, 1960 |
| 2,949,007 | Aldrich et al. | Aug. 16, 1960 |
| 2,982,495 | Griffith | May 2, 1961 |
| 2,987,271 | Heath | June 6, 1961 |

FOREIGN PATENTS

| | | |
|---|---|---|
| 333,081 | Italy | Dec. 19, 1935 |
| 733,243 | Great Britain | July 6, 1955 |